US009485319B1

(12) United States Patent
Cavalin et al.

(10) Patent No.: US 9,485,319 B1
(45) Date of Patent: Nov. 1, 2016

(54) SIMULATION TO FIND USER BEHAVIOR IMPACT IN SOCIAL MEDIA NETWORK

(71) Applicant: International Business Machines Corporation, Armonk, NY (US)

(72) Inventors: Paulo R. Cavalin, Rio de Janeiro (BR); Maira Gatti De Bayser, Rio de Janeiro (BR); Cicero N. Dos Santos, Rio de Janeiro (BR); Davi M. Valladao, Rio de Janiero (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/984,593

(22) Filed: Dec. 30, 2015

(51) Int. Cl.
*H04L 29/08* (2006.01)

(52) U.S. Cl.
CPC ............. *H04L 67/22* (2013.01); *H04L 67/306* (2013.01)

(58) Field of Classification Search
None
See application file for complete search history.

(56) References Cited

U.S. PATENT DOCUMENTS

| 7,778,948 | B2 | 8/2010 | Johnson et al. |
| 8,312,056 | B1 | 11/2012 | Peng et al. |
| 2011/0258049 | A1* | 10/2011 | Ramer ............... G06F 17/30867 705/14.66 |
| 2012/0158630 | A1 | 6/2012 | Zaman et al. |
| 2012/0266191 | A1 | 10/2012 | Abrahamsson et al. |
| 2012/0323537 | A1* | 12/2012 | Bocharov ............... G06F 17/18 703/2 |
| 2014/0330548 | A1* | 11/2014 | Appel ................. G06Q 10/101 703/6 |

FOREIGN PATENT DOCUMENTS

| WO | 2014116276 | 7/2014 |
| WO | 2014124039 | 8/2014 |
| WO | 2014143729 | 9/2014 |
| WO | 2014144893 | 9/2014 |
| WO | 2014145801 | 9/2014 |

OTHER PUBLICATIONS

Gill, "Improving NESB Students' Learning in Communication Through Simulating Social Media: An Australian Case Study.", International Journal of Learning and Development 2.6, (2012), pp. 93-106.
Zakhidov et al., "Using a Game-based Simluation to Complement Face-to-Face Medical Education: Preliminary findings", University of Texas, Dallas (2014) 3 pages.
Banos, R.A. et al., "The role of hidden influentials in the diffusion of online information cascades", EPJ Data Science, (2013), vol. 2, No. 6, pp. 1-16.

(Continued)

*Primary Examiner* — Angela Nguyen
(74) *Attorney, Agent, or Firm* — Scully, Scott, Murphy & Presser, P.C.; Louis J. Percello, Esq.

(57) ABSTRACT

Provided is a mechanism which may use a real Online Social Network (OSN) to simulate user behavior based on what the user(s) post in order to analyze how the information is spread across a network. In various embodiments, the disclosed mechanisms may be implemented via systems, methods and/or computer program products.

20 Claims, 8 Drawing Sheets

(56) References Cited

OTHER PUBLICATIONS

Kelley, C.T., Iterative Methods for Optimization, SIAM Frontiers in Applied Mathematics, (1999), No. 18, 188 pages.

Gatti, M. A. et al.,"A Simulation-Based Approach to Analyze the Information Diffusion in Microblogging Online Social Network", Proceedings of the 2013 Winter Simulation Conference, (2013), 12 pages.

Dey, L., et al., "Detection and Characterization of Anomalous Entities in Social Communication Networks", 2010 International Conference on Pattern Recognition, (2010), 5 pages.

\* cited by examiner

Step 1

- Simulate network without changing the behavior (generate x(t))

Step 2

- Estimate $f_1$ $\quad \min_{\theta_1} \sum_{j=1}^{T} (f_1(t_j, \theta_1) - x(t_j))^2 \quad$ Equation (1)

Step 3

- Simulate network with behavior change (generate $\hat{x}$)

Step 4

- Estimate $f_2$   $\min_{\theta_2} \sum_{j=1}^{T} (f_1(t_j, \theta_1) + f_2(t_j, \theta_2) - \hat{x}(t_j))^2$   Equation (2)

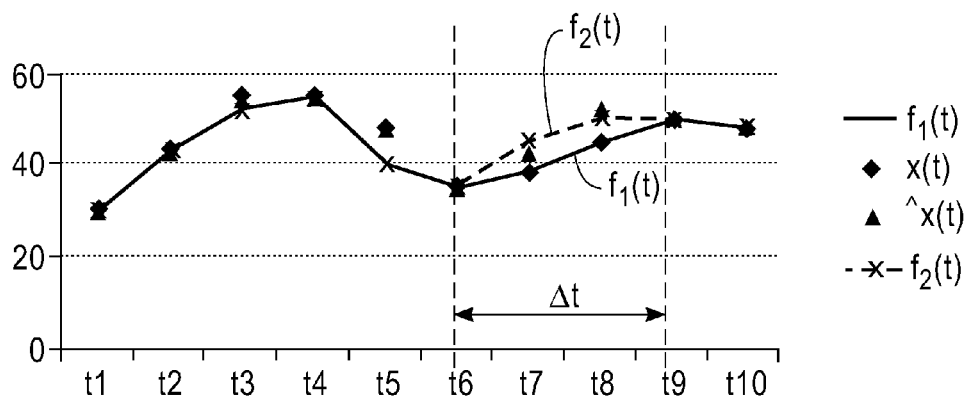
- From $\Theta_2$ infer $\Delta t$ (impact duration)
$f_1(t, \theta)$ —Unchanged simulation
$f_1(t, \theta) + c1_{t_i \leq t \leq b}$ ... Changed simulation
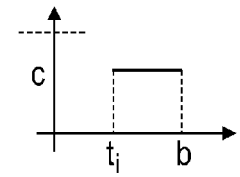
FIG. 6

SIMULATION TO FIND USER BEHAVIOR IMPACT IN SOCIAL MEDIA NETWORK

BACKGROUND

Simulation has been applied with success in a large number of works. For example, in Gatti, M. A. C., A. P. Appel, C. N. Santos, C. S. Pinhanez, P. R. Cavalin, and S. M. B. Neto. "A Simulation-based Approach to Analyze the Information Diffusion in Microblogging Online Social Network" (*Proc. of the Winter Simulation Conference, WSC'*13, Berlin, 2013), a stochastic multi-agent based simulation (SMSim) is used where each agent represents a user in a sampled egocentric social network. In the SMSim simulator each agent encapsulates the behavior of a social media network user. The environment where the agents operate and interact is the followers graph extracted from the social media network. The SMSim is modeled as a discrete-event simulation where the operation of the system is represented as a chronological sequence of events. An agent's basic actions in the simulator are To Read or To Post and its states are Idle or Posting and in both states the agent reads the received messages from whom he or she follows and posting or not depending on the modeled behavior. When the agent is posting a message, at the simulator level, it is sending the message to all its followers. The message can have a number of features, for instance, a positive or negative sentiment about a topic. Each agent behavior is determined by a Markov Chain Monte Carlo simulation method where the Markov Chain transitions probabilities are estimated from the sampling data. When the SMSim is started, each agent switches its behavior to Posting or Idle depending on the activated transitions using a Monte Carlo method. The transition will only be activated if the probability value calculated corresponds to a random value generated by the system. If no transition is activated, the system switches the user's state to Idle. Some experiments were run in the simulator to evaluate the effect of removing the most engaged users, aiming to find those that have the most effect on the information flow. Visual analytics on time series had to be performed in order to observe the effect. Removing the top 100 most engaged users had more effect than removing the seed (as used here, the observed effect means that it consistently effects the number of messages sent by the users over time). However, visual analytics typically does not scale nor enable automatic optimization of planning by parameter tuning on the users' behavior. To summarize the above, a social network is used as input for the model acting in the simulation (and in this case, the agents will represent the user and his/her followers (or friends or connections) in the social network; in addition, these agents simulate how messages are exchanged between these users).

Other techniques include: pattern recognition; time-series analysis (to predict outliers); linear models; non-linear least squares method; outlier detection; step detection problem (signal processing, digital image processing, noise reduction); social network analysis; and various methods to find "who" and/or "when" but not "how long" all together.

In any case, for the study of information diffusion in large Online Social Networks (OSNs) there is still a lack of work.

Accordingly, as described herein the present disclosure provides a mechanism which scales and enables enable automatic optimization of planning by parameter tuning on the users' behavior.

Further, as described herein the present disclosure provides a mechanism which relies on using a real OSN to simulate the users' behavior based on what they post in order to analyze how the information is spread across a network.

In various embodiments, such disclosed mechanisms may be implemented via systems, methods and/or computer program products.

SUMMARY

One embodiment relates to determining both how long and how far simulated user behavior actions impact a social media network.

In one embodiment, a computer-implemented method for determining an impact of a behavior of at least one user in a social media network is provided, the method comprising: obtaining, by a processor, at least one characteristic describing the behavior of the user in a simulation of the social media network; determining by the processor, via use of a time series based modeler which uses a linear regression method, a first function of the at least one characteristic, wherein the first function describes a first model of a behavior of the simulated social media network with respect to time; changing, by the processor, the at least one characteristic to obtain at least one changed characteristic; determining by the processor, via use of a time series based modeler which uses a linear regression method, a second function of the at least one changed characteristic, wherein the second function describes a second model of the behavior of the simulated social media network with respect to time; comparing, by the processor, the first function and the second function over time by using a linear or non-linear least squares method to determine at least one difference in at least one impact duration of time; determining, by the processor, a simulated amount of an effect of the difference in at least one impact duration of time at each of a plurality of nodes within one or more levels of the social media network; and outputting, by the processor, data indicative of the determined simulated amount of the effect of the difference in at least one impact duration of time at each of the plurality of nodes within one or more levels of the social media network.

In another embodiment, a computer readable storage medium, tangibly embodying a program of instructions executable by the computer for determining an impact of a behavior of at least one user in a social media network is provided, the program of instructions, when executing, performing the following steps: obtaining at least one characteristic describing the behavior of the user in a simulation of the social media network; determining, via use of a time series based modeler which uses a linear regression method, a first function of the at least one characteristic, wherein the first function describes a first model of a behavior of the simulated social media network with respect to time; changing the at least one characteristic to obtain at least one changed characteristic; determining, via use of a time series based modeler which uses a linear regression method, a second function of the at least one changed characteristic, wherein the second function describes a second model of the behavior of the simulated social media network with respect to time; comparing the first function and the second function over time by using a linear or non-linear least squares method to determine at least one difference in at least one impact duration of time; determining a simulated amount of an effect of the difference in at least one impact duration of time at each of a plurality of nodes within one or more levels of the social media network; and outputting data indicative of the determined simulated amount of the effect of the difference in at least one impact duration of time at each of the plurality of nodes within one or more levels of the social media network.

In another embodiment, a computer-implemented system for determining an impact of a behavior of at least one user in a social media network is provided, the system comprising: a processor; and a memory storing computer readable instructions that, when executed by the processor, implement: an obtaining element configured to obtain at least one characteristic describing the behavior of the user in a simulation of the social media network; a first determining element configured to determine, via use of a time series based modeler which uses a linear regression method, a first function of the at least one characteristic, wherein the first function describes a first model of a behavior of the simulated social media network with respect to time; a changing element configured to change the at least one characteristic to obtain at least one changed characteristic; a second determining element configured to determine, via use of a time series based modeler which uses a linear regression method, a second function of the at least one changed characteristic, wherein the second function describes a second model of the behavior of the simulated social media network with respect to time; a comparing element configured to compare the first function and the second function over time by using a linear or non-linear least squares method to determine at least one difference in at least one impact duration of time; a third determining element configured to determine a simulated amount of an effect of the difference in at least one impact duration of time at each of a plurality of nodes within one or more levels of the social media network; and an outputting element configured to output data indicative of the determined simulated amount of the effect of the difference in at least one impact duration of time at each of the plurality of nodes within one or more levels of the social media network.

BRIEF DESCRIPTION OF THE DRAWINGS

Various objects, features and advantages of the present invention will become apparent to one skilled in the art, in view of the following detailed description taken in combination with the attached drawings, in which:

FIG. 6 depicts a graph showing data according to an embodiment.

DETAILED DESCRIPTION

Figure 1:
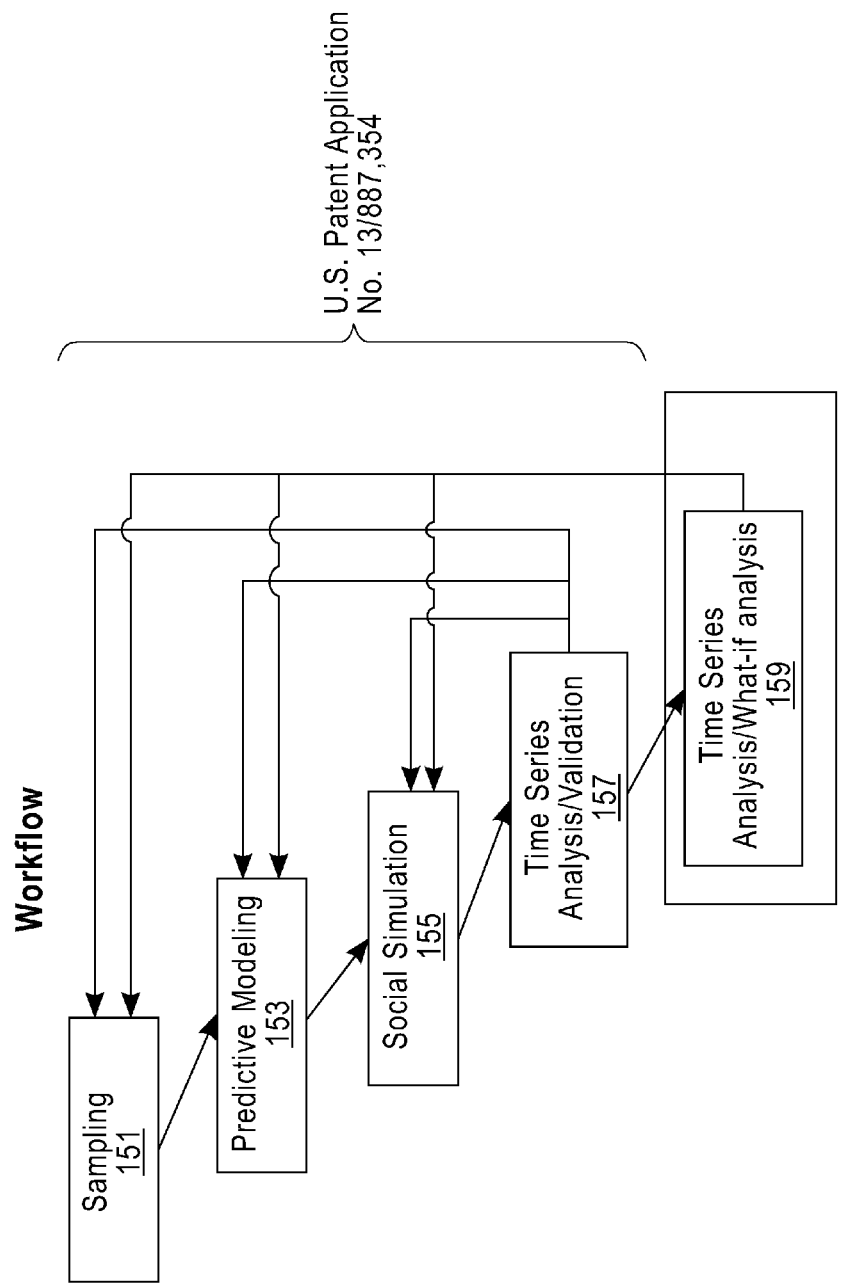
FIG. 1 depicts a block diagram showing an example workflow according to an embodiment (the bracketed portions show workflow relating to the disclosure in U.S. patent application Ser. No. 13/887,354, the entire contents of which is incorporated herein by reference as if fully set forth herein).

Referring now to FIG. 1, a workflow according to an embodiment is shown (including sampling 151, predictive modeling 153, social simulation 155, time series analysis/validation 157 and time series analysis/what-if analysis 159).

As described herein, a mechanism is provided for performing time series analysis on simulated data in order to estimate the parameters that define how long an action impacts the system. The simulation data is computed after sampling and modeling the user's behavior based on observed data and running what-if analysis on the simulation of the interactions of the learned behavior. By performing the time series analysis for each user, one can also determine how far in the network the action impact reaches. The time series analysis may use linear regression and linear or non-linear least squares method to predict the impact. In this embodiment, the mechanism may operate using the following steps.

Figure 2:
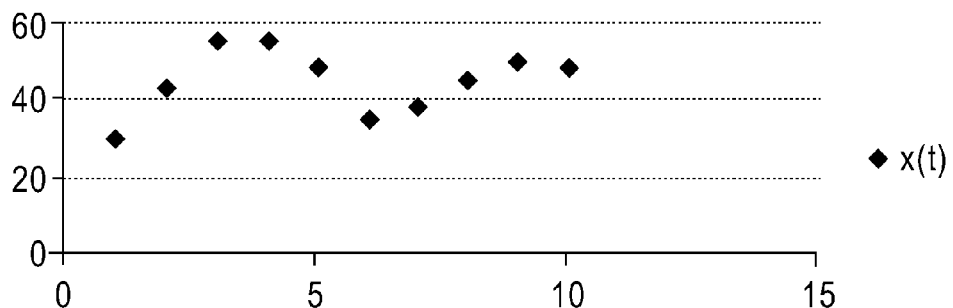
FIG. 2 depicts a graph showing data according to an embodiment.

Step 1—simulate the social network without changing the behavior. As shown in FIG. 2, the user models are loaded in the simulator and one or more characteristics (e.g. x(t) as the volume of messages over time) describing the behavior is computed (in one example, this may be performed after the predictive modeling (see element 153 of FIG. 1)).

Figure 3:
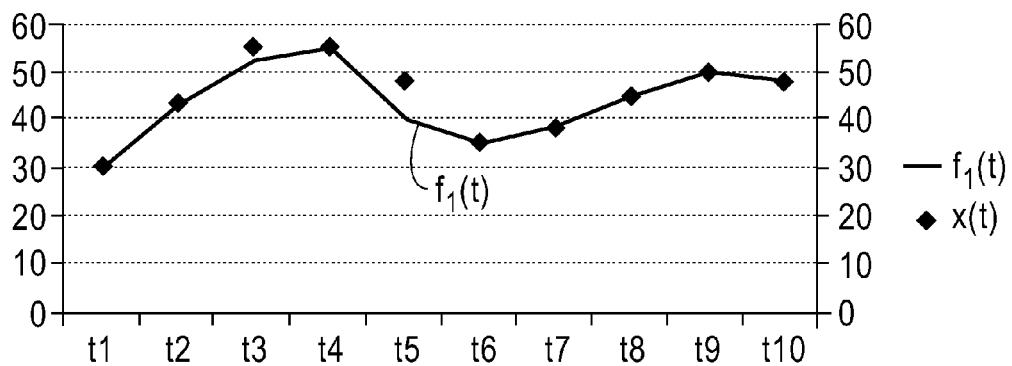
FIG. 3 depicts a graph showing data according to an embodiment.

Step 2—estimate the functions that correspond to the characteristics. As shown in FIG. 3, a time series based modeler that uses linear regression determines a first function $f_1$ (estimated by equation (1) shown in FIG. 3) of one or more of the characteristics θ to develop a first model of the behavior of the social media network over time.

Figure 4:
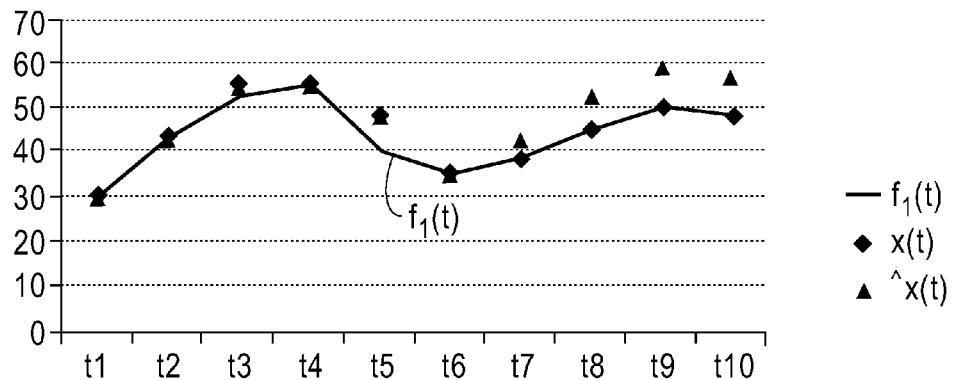
FIG. 4 depicts a graph showing data according to an embodiment.

Step 3—simulate the social network with changes of the behavior. As shown in FIG. 4, one or more of the users' behavior is changed to produce one or more simulated characteristics (e.g. $\hat{x}(t)$ as the volume of messages over time).

Figure 5:
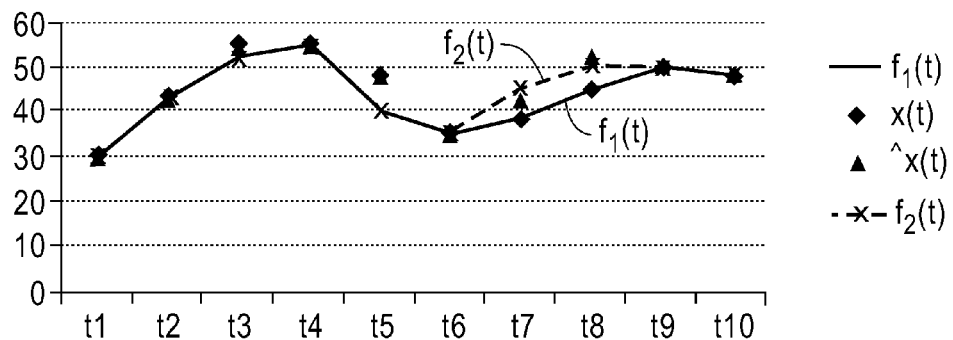
FIG. 5 depicts a graph showing data according to an embodiment.

Step 4—estimate one or more second functions. As shown in FIG. 5, the one or more simulated characteristics from Step 3 (e.g. $\hat{x}(t)$ as the volume of messages over time) are used to estimate one or more second functions $f_2$ (estimated by equation (2) shown in FIG. 5) describing the simulated behavior characteristics θ of the social media network over time.

Step 5—estimate the impact duration over time. As shown in FIG. 6, a comparator is used to compare the first function ($f_1$) and second function ($f_2$) over time using linear and non-linear least squares method (see, e.g., C. T. Kelley, Iterative Methods for Optimization, SIAM Frontiers in Applied Mathematics, no 18, 1999, ISBN 0-89871-433-8) to determine the differences in one or more impact durations of time (Δt). Of note, in the example of this FIG. 6, the first function ($f_1$) is a function that predicts unchanged behavior over time; the second function ($f_2$) is a function that predicts the changed behavior over time; and Δt (impact duration)=t9−t6.

Still referring to FIG. 6, it is noted that with respect to the changed simulation and the c, $t_i$, b graph in the right hand bottom corner, that the c and b parameters represent the impact of the simulation in the data generated by the original model. The parameter c represents how much the original model will be changed, and b represents how long the simulation will run.

Figure 7B:
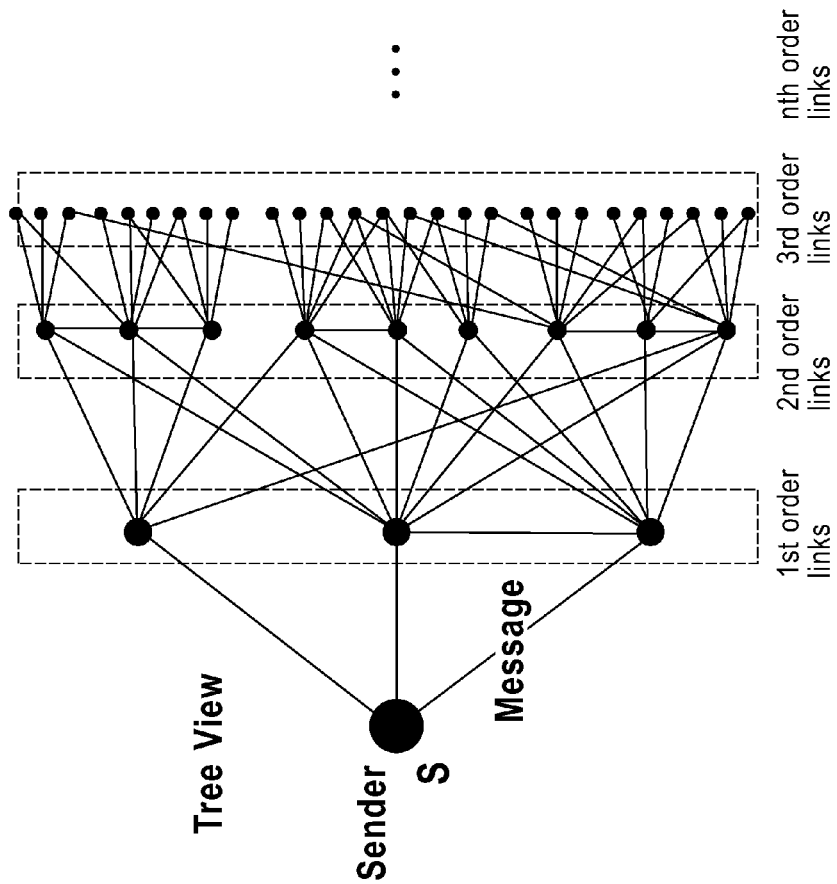
FIG. 7B depicts a diagram showing a tree view of a social network according to an embodiment.
Figure 7A:
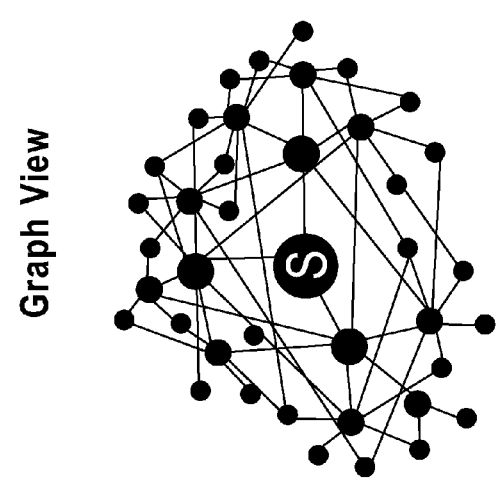
FIG. 7A depicts a diagram showing a graph view of a social network according to an embodiment.

Step 6—estimate the impact duration in the network. With the estimated Δt, estimate the amount of effect of the change at each node (see the graph view of FIG. 7A and the tree view of FIG. 7B) within one or more degrees (distance from the source of change—that is, how far) in the social media network (i.e., with reference to FIG. 7B, find the highest link order in the network that will be reached in the Δt (impact duration). In one example, the impact duration in the network here means the number of time steps that the volume of messages in the simulated network increases due to the influencer's behavior change. This is estimated by comparing: (a) the time series produced with the simulation where the default behavior is used; with (b) the time series produced with the simulation where there is a different behavior of the influencer.

In one specific example, the disclosed mechanism may be implemented in an online planner of the simulator to estimate the change in the users' behaviors by exploring a set of user actions that should be activated or deactivated without human intervention. In this example, the output is the set of actions that maximize the influence in the network by reaching more users with the highest time duration.

Figure 8:
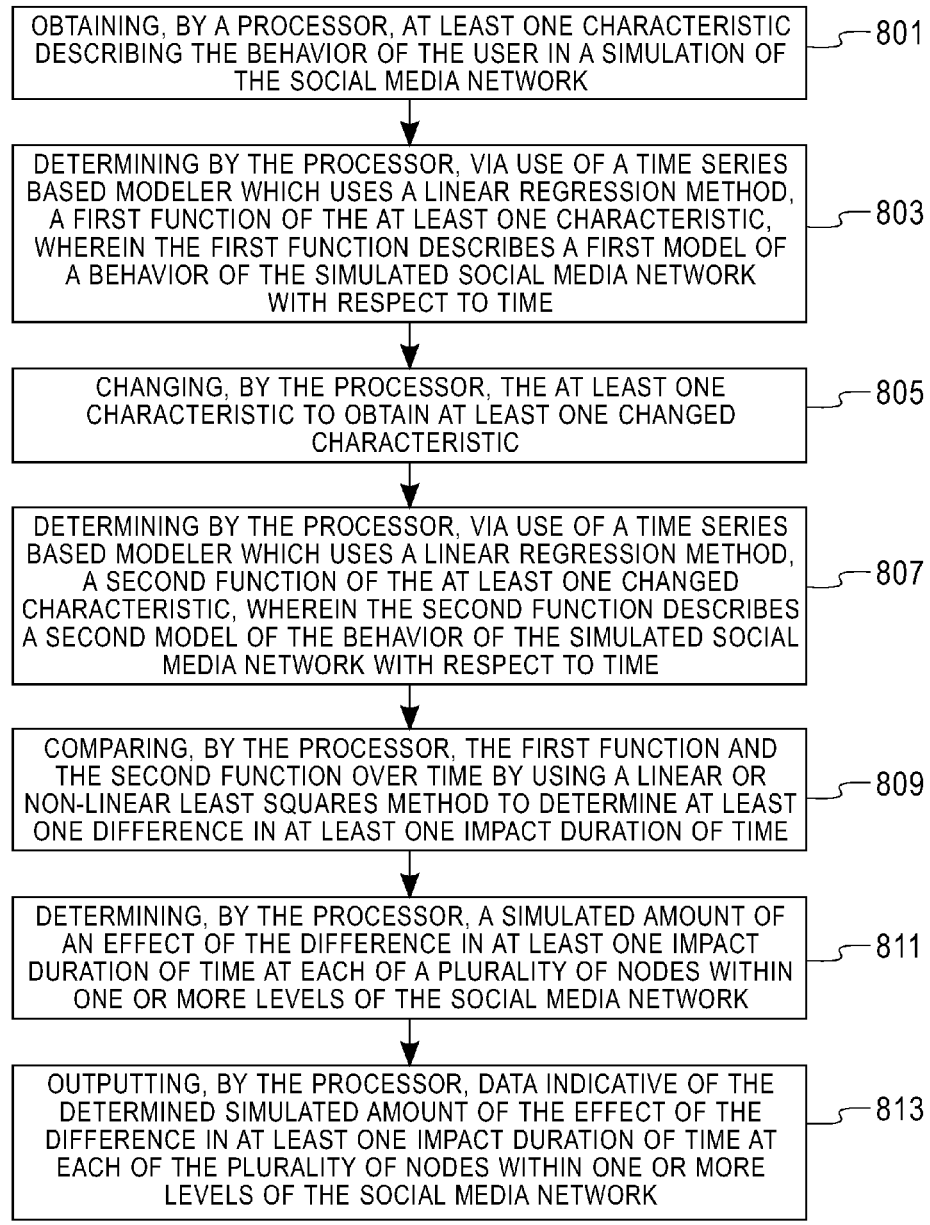
FIG. 8 depicts a block diagram of a method according to an embodiment.

Referring now to FIG. 8, a method for determining an impact of a behavior of at least one user in a social media network is shown. As seen in this FIG. 8, the method of this embodiment comprises: at 801—obtaining, by a processor, at least one characteristic describing the behavior of the user in a simulation of the social media network; at 803—determining by the processor, via use of a time series based modeler which uses a linear regression method, a first function of the at least one characteristic, wherein the first function describes a first model of a behavior of the simulated social media network with respect to time; at 805—changing, by the processor, the at least one characteristic to obtain at least one changed characteristic; at 807—determining by the processor, via use of a time series based modeler which uses a linear regression method, a second function of the at least one changed characteristic, wherein the second function describes a second model of the behavior of the simulated social media network with respect to time; at 809—comparing, by the processor, the first function and the second function over time by using a linear or non-linear least squares method to determine at least one difference in at least one impact duration of time; at 811—determining, by the processor, an actual amount of an effect of the difference in at least one impact duration of time at each of a plurality of nodes within one or more levels of the social media network; and at 813—outputting, by the processor, data indicative of the determined simulated amount of the effect of the difference in at least one impact duration of time at each of the plurality of nodes within one or more levels of the social media network.

In one specific example, the determining the actual amount of the effect of the difference in the at least one impact duration of time at each of the plurality of nodes may comprise measuring a depth of the effect based on a distance between a source of an action and each user who reacted to that action during the observed (or estimated) time of impact.

Figure 9:
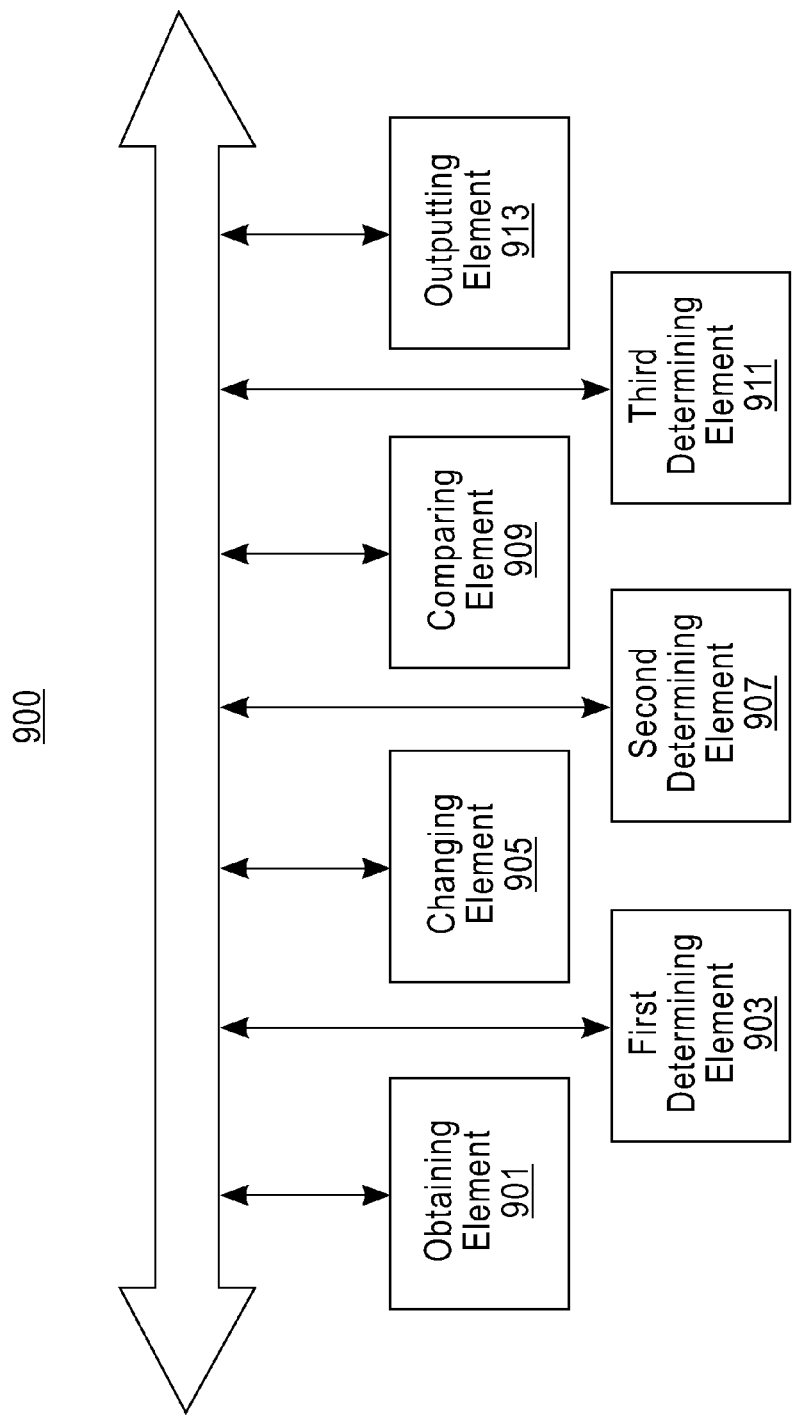
FIG. 9 depicts a block diagram of a system according to an embodiment.

Referring now to FIG. 9, in another embodiment, a system 900 for determining an impact of a behavior of at least one user in a social media network is provided. This system may include a processor (not shown); and a memory (not shown) storing computer readable instructions that, when executed by the processor, implement: an obtaining element 901 configured to obtain at least one characteristic describing the behavior of the user in a simulation of the social media network; a first determining element 903 (e.g., a simulator) configured to determine, via use of a time series based modeler which uses a linear regression method, a first function of the at least one characteristic, wherein the first function describes a first model of a behavior of the simulated social media network with respect to time; a changing element 905 configured to change the at least one characteristic to obtain at least one changed characteristic; a second determining element 907 (e.g., a simulator) configured to determine, via use of a time series based modeler which uses a linear regression method, a second function of the at least one changed characteristic, wherein the second function describes a second model of the behavior of the simulated social media network with respect to time; a comparing element 909 (e.g., a comparator) configured to compare the first function and the second function over time by using a linear or non-linear least squares method to determine at least one difference in at least one impact duration of time; a third determining element 911 (e.g., a network analyzer) configured to determine a simulated amount of an effect of the difference in at least one impact duration of time at each of a plurality of nodes within one or more levels of the social media network; and an outputting element 913 configured to output data indicative of the determined simulated amount of the effect of the difference in at least one impact duration of time at each of the plurality of nodes within one or more levels of the social media network.

In one example, communication between and among the various components of FIG. 9 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 10.

Figure 10:
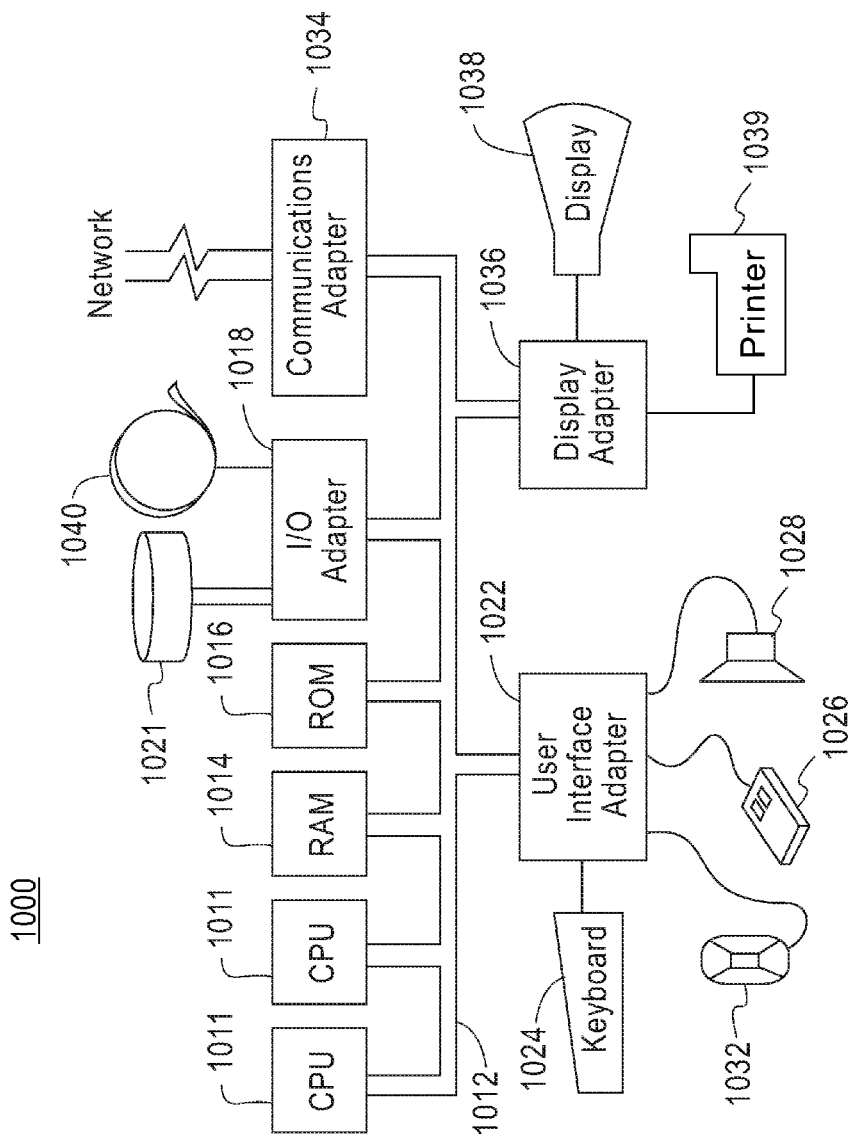
FIG. 10 depicts a block diagram of a system according to an embodiment.

Referring now to FIG. 10, this figure shows a hardware configuration of computing system 1000 according to an embodiment of the present invention. As seen, this hardware configuration has at least one processor or central processing unit (CPU) 1011. The CPUs 1011 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communications adapter 1034 for connecting the system 1000 to a data processing network, the Internet, an Intranet, a local area network (LAN), etc., and a display adapter 1036 for connecting the bus 1012 to a display device 1038 and/or printer 1039 (e.g., a digital printer or the like).

As described herein, various embodiments may provide for testing new actions and evaluating impact of the new actions. In one specific example, one or more predictions may be provided directed to an impact (based on one or more user behavior actions) on a social media network.

In another embodiment, a mechanism may be provided for simulating an online social network, the mechanism comprising: modeling behavior data of a user, said behavior data comprising sampled real data; and simulating a behavior of the online social network using the modeled data.

In another embodiment, a mechanism may be provided for simulating an online social network, the mechanism comprising: modeling a microscopic behavior of one or more users in the online social network; and simulating a macroscopic behavior of the online social network, wherein said modeling is based on sampled real data and wherein said simulating is based on said modeling.

In another embodiment, a mechanism may be provided for simulating an online social network, the mechanism comprising: a modeler for modeling sampled real data; and a simulator for simulating the online social network using the modeled data.

In one embodiment, a computer-implemented method for determining an impact of a behavior of at least one user in a social media network is provided, the method comprising: obtaining, by a processor, at least one characteristic describing the behavior of the user in a simulation of the social media network; determining by the processor, via use of a time series based modeler which uses a linear regression method, a first function of the at least one characteristic, wherein the first function describes a first model of a behavior of the simulated social media network with respect to time; changing, by the processor, the at least one characteristic to obtain at least one changed characteristic; determining by the processor, via use of a time series based modeler which uses a linear regression method, a second function of the at least one changed characteristic, wherein the second function describes a second model of the behavior of the simulated social media network with respect to time; comparing, by the processor, the first function and the second function over time by using a linear or non-linear least squares method to determine at least one difference in at least one impact duration of time; determining, by the processor, a simulated amount of an effect of the difference in at least one impact duration of time at each of a plurality of nodes within one or more levels of the social media network; and outputting, by the processor, data indicative of the determined simulated amount of the effect of the difference in at least one impact duration of time at each of the plurality of nodes within one or more levels of the social media network.

In one example, the at least one characteristic comprises at least one of: (a) a volume of messages of a particular topic that describes the behavior of the user; (b) a volume of messages of a particular sentiment that describes the behavior of the user; and (c) any combination thereof.

In another example, the sentiment is selected from the group of: (a) positive; (b) negative; and (c) neutral.

In another example, the at least one characteristic comprises a plurality of characteristics, each of the plurality of characteristics corresponding to each of a plurality of behaviors of the user.

In another example, the at least one characteristic comprises at least one characteristic for each of a plurality of users, each characteristic associated with a respective user corresponding to each of a plurality of behaviors of the respective user.

In another example, the at least one characteristic for each of the plurality of users comprises a plurality of characteristics for each of the users, each of the plurality of characteristics associated with a respective user corresponding to each of a plurality of behaviors of the respective user.

In another example, the determining the simulated amount of the effect of the difference in the at least one impact duration of time at each of the plurality of nodes is performed by using a network analyzer.

In another example, the network analyzer determines the simulated amount of the effect of the difference in the at least one impact duration of time at each of the plurality of nodes by reacting to the characteristic being observed.

In another example, the reacting to the characteristic being observed comprises reacting to a propagation of a message, the propagation of the message comprising at least one of: (a) a replying to the message; and (b) a forwarding of the message.

In another example, the determining the simulated amount of the effect of the difference in the at least one impact duration of time at each of the plurality of nodes comprises measuring a depth of the effect based on a distance between a source of an action and each user who reacted to that action during the observed time of impact.

In another example, the time series based modeler which uses the linear regression method to determine the first function is the same as the time series based modeler which uses the linear regression method to determine the second function.

In another example, the time series based modeler which uses the linear regression method to determine the first function is different from the time series based modeler which uses the linear regression method to determine the second function.

In another embodiment, a computer readable storage medium, tangibly embodying a program of instructions executable by the computer for determining an impact of a behavior of at least one user in a social media network is provided, the program of instructions, when executing, performing the following steps: obtaining at least one characteristic describing the behavior of the user in a simulation of the social media network; determining, via use of a time series based modeler which uses a linear regression method, a first function of the at least one characteristic, wherein the first function describes a first model of a behavior of the simulated social media network with respect to time; changing the at least one characteristic to obtain at least one changed characteristic; determining, via use of a time series based modeler which uses a linear regression method, a second function of the at least one changed characteristic, wherein the second function describes a second model of the behavior of the simulated social media network with respect to time; comparing the first function and the second function over time by using a linear or non-linear least squares method to determine at least one difference in at least one impact duration of time; determining a simulated amount of an effect of the difference in at least one impact duration of time at each of a plurality of nodes within one or more levels of the social media network; and outputting data indicative of the determined simulated amount of the effect of the difference in at least one impact duration of time at each of the plurality of nodes within one or more levels of the social media network.

In one example, the determining the simulated amount of the effect of the difference in the at least one impact duration of time at each of the plurality of nodes is performed by using a network analyzer.

In another example, the network analyzer determines the simulated amount of the effect of the difference in the at least one impact duration of time at each of the plurality of nodes by reacting to the characteristic being observed.

In another example, the reacting to the characteristic being observed comprises reacting to a propagation of a message, the propagation of the message comprising at least one of: (a) a replying to the message; and (b) a forwarding of the message.

In another embodiment, a computer-implemented system for determining an impact of a behavior of at least one user in a social media network is provided, the system comprising: a processor; and a memory storing computer readable instructions that, when executed by the processor, implement: an obtaining element configured to obtain at least one characteristic describing the behavior of the user in a simulation of the social media network; a first determining element configured to determine, via use of a time series based modeler which uses a linear regression method, a first function of the at least one characteristic, wherein the first function describes a first model of a behavior of the simulated social media network with respect to time; a changing element configured to change the at least one characteristic to obtain at least one changed characteristic; a second determining element configured to determine, via use of a time series based modeler which uses a linear regression method, a second function of the at least one changed characteristic, wherein the second function describes a second model of the behavior of the simulated social media network with respect to time; a comparing element configured to compare the first function and the second function over time by using a linear or non-linear least squares method to determine at least one difference in at least one impact duration of time; a third determining element configured to determine a simulated amount of an effect of the difference in at least one impact duration of time at each of a plurality of nodes within one or more levels of the social media network; and an outputting element configured to output data indicative of the determined simulated amount of the effect of the difference in at least one impact duration of time at each of the plurality of nodes within one or more levels of the social media network.

In one example, the outputting element is configured to output the data to at least one of: (a) a display; (b) a hardcopy printer; (c) a data storage device; and (d) any combination thereof.

In another example, the determining the simulated amount of the effect of the difference in the at least one impact duration of time at each of the plurality of nodes is performed by using a network analyzer.

In another example, the network analyzer determines the simulated amount of the effect of the difference in the at least one impact duration of time at each of the plurality of nodes by reacting to the characteristic being observed.

With respect now to obtaining a characteristic and then modeling a behavior of the simulated social network using a first function, the first function may (in one example) represent the behavior of the users in terms of posting messages, which can be represented by the number of messages posted over a given time window. A function that is fit to the data gathered from the real users can then represent this posting behavior, and be used later in the simulation.

With respect now to changing a characteristic and then modeling a behavior of the simulated social network using a second function, the second function may (in one example) represent the behavior of the users in terms of posting messages, which can be represented by the number of messages posted over a given time window. A function that is fit to the data gathered from the real users can then represent this posting behavior, and be used later in the simulation.

In one specific example, if the characteristic is a volume of messages, the corresponding function modeling the behavior of the simulated social network may model a multivariate time series, where each time step contains a 3-dimensional vector representing the sentiments.

In one specific example, the data obtained from the actual social media network (as compared to the simulated social media network) may be (for each user) the total of messages posted at given time windows, in a specific time frame.

In other examples, any steps described herein may be carried out in any appropriate desired order.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for determining an impact of a behavior of at least one user in a social media network, the method comprising:
   obtaining, by a processor, at least one characteristic describing the behavior of the user in a simulation of the social media network;
   determining by the processor, via use of a time series based modeler which uses a linear regression method, a first function of the at least one characteristic, wherein the first function describes a first model of a behavior of the simulated social media network with respect to time;
   changing, by the processor, the at least one characteristic to obtain at least one changed characteristic;
   determining by the processor, via use of a time series based modeler which uses a linear regression method, a second function of the at least one changed characteristic, wherein the second function describes a second model of the behavior of the simulated social media network with respect to time;
   comparing, by the processor, the first function and the second function over time by using a linear or non-linear least squares method to determine at least one difference in at least one impact duration of time, the at least one impact duration of time being an amount of time during which a volume of messages associated with the second function differs, after a point of substantial equality, from a volume of messages associated with the first function;
   determining, by the processor, a simulated amount of an effect of the difference in at least one impact duration of time at each of a plurality of nodes within one or more levels of the social media network; and
   outputting, by the processor, data indicative of the determined simulated amount of the effect of the difference in at least one impact duration of time at each of the plurality of nodes within one or more levels of the social media network.

2. The method of claim 1, wherein the at least one characteristic comprises at least one of: (a) a volume of messages of a particular topic that describes the behavior of the user; (b) a volume of messages of a particular sentiment that describes the behavior of the user; and (c) any combination thereof.

3. The method of claim 1, wherein the at least one characteristic comprises a plurality of characteristics, each of the plurality of characteristics corresponding to each of a plurality of behaviors of the user.

4. The method of claim 1, wherein the at least one characteristic comprises at least one characteristic for each of a plurality of users, each characteristic associated with a respective user corresponding to each of a plurality of behaviors of the respective user.

5. The method of claim 1, wherein the determining the simulated amount of the effect of the difference in the at least one impact duration of time at each of the plurality of nodes is performed by using a network analyzer.

6. The method of claim 1, wherein the determining the simulated amount of the effect of the difference in the at least one impact duration of time at each of the plurality of nodes comprises measuring a depth of the effect based on a distance between a source of an action and each user who reacted to that action during the observed time of impact.

7. The method of claim 1, wherein the time series based modeler which uses the linear regression method to determine the first function is the same as the time series based modeler which uses the linear regression method to determine the second function.

8. The method of claim 1, wherein the time series based modeler which uses the linear regression method to determine the first function is different from the time series based modeler which uses the linear regression method to determine the second function.

9. The method of claim 1, wherein the at least one impact duration of time is the amount of time during which the volume of messages associated with the second function is greater, after the point of substantial equality, than the volume of messages associated with the first function.

10. The method of claim 2, wherein the sentiment is selected from the group of: (a) positive; (b) negative; and (c) neutral.

11. The method of claim 4, wherein the at least one characteristic for each of the plurality of users comprises a plurality of characteristics for each of the users, each of the plurality of characteristics associated with a respective user corresponding to each of a plurality of behaviors of the respective user.

12. The method of claim 5, wherein the network analyzer determines the simulated amount of the effect of the difference in the at least one impact duration of time at each of the plurality of nodes by reacting to the characteristic being observed.

13. A non-transitory computer readable storage medium, tangibly embodying a program of instructions executable by the computer for determining an impact of a behavior of at least one user in a social media network, the program of instructions, when executing, performing the following steps:
  obtaining at least one characteristic describing the behavior of the user in a simulation of the social media network;
  determining, via use of a time series based modeler which uses a linear regression method, a first function of the at least one characteristic, wherein the first function describes a first model of a behavior of the simulated social media network with respect to time;
  changing the at least one characteristic to obtain at least one changed characteristic;
  determining, via use of a time series based modeler which uses a linear regression method, a second function of the at least one changed characteristic, wherein the second function describes a second model of the behavior of the simulated social media network with respect to time;
  comparing the first function and the second function over time by using a linear or non-linear least squares method to determine at least one difference in at least one impact duration of time, the at least one impact duration of time being an amount of time during which a volume of messages associated with the second function differs, after a point of substantial equality, from a volume of messages associated with the first function;
  determining a simulated amount of an effect of the difference in at least one impact duration of time at each of a plurality of nodes within one or more levels of the social media network; and
  outputting data indicative of the determined simulated amount of the effect of the difference in at least one impact duration of time at each of the plurality of nodes within one or more levels of the social media network.

14. The non-transitory computer readable storage medium of claim 13, wherein the determining the simulated amount of the effect of the difference in the at least one impact duration of time at each of the plurality of nodes is performed by using a network analyzer.

15. The non-transitory computer readable storage medium of claim 13, wherein the at least one impact duration of time is the amount of time during which the volume of messages associated with the second function is greater, after the point of substantial equality, than the volume of messages associated with the first function.

16. The non-transitory computer readable storage medium of claim 14, wherein the network analyzer determines the simulated amount of the effect of the difference in the at least one impact duration of time at each of the plurality of nodes by reacting to the characteristic being observed.

17. A computer-implemented system for determining an impact of a behavior of at least one user in a social media network, the system comprising:
  a processor; and
  a memory storing computer readable instructions that, when executed by the processor, implement steps of:
  obtaining at least one characteristic describing the behavior of the user in a simulation of the social media network;
  determining, via use of a time series based modeler which uses a linear regression method, a first function of the at least one characteristic, wherein the first function describes a first model of a behavior of the simulated social media network with respect to time;
  changing the at least one characteristic to obtain at least one changed characteristic;
  determining, via use of a time series based modeler which uses a linear regression method, a second function of the at least one changed characteristic, wherein the second function describes a second model of the behavior of the simulated social media network with respect to time;
  comparing the first function and the second function over time by using a linear or non-linear least squares method to determine at least one difference in at least one impact duration of time, the at least one impact duration of time being an amount of time during which a volume of messages associated with the second function differs, after a point of substantial equality, from a volume of messages associated with the first function;
  determining a simulated amount of an effect of the difference in at least one impact duration of time at each of a plurality of nodes within one or more levels of the social media network; and
  outputting data indicative of the determined simulated amount of the effect of the difference in at least one impact duration of time at each of the plurality of nodes within one or more levels of the social media network.

18. The system of claim 17, wherein the outputting is configured to output the data to at least one of: (a) a display; (b) a hardcopy printer; (c) a data storage device; and (d) any combination thereof.

19. The system of claim 17, wherein the determining the simulated amount of the effect of the difference in the at least one impact duration of time at each of the plurality of nodes is performed by using a network analyzer.

20. The system of claim 17, wherein the at least one impact duration of time is the amount of time during which the volume of messages associated with the second function is greater, after the point of substantial equality, than the volume of messages associated with the first function.

* * * * *